E. E. SLICK.
METHOD OF WELDING.
APPLICATION FILED APR. 7, 1914.
1,161,419.
Patented Nov. 23, 1915.
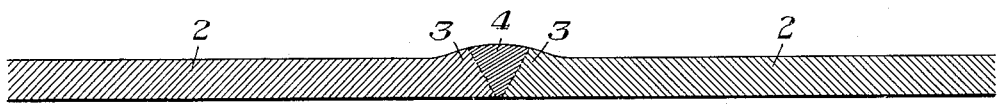
WITNESSES
INVENTOR

UNITED STATES PATENT OFFICE.

EDWIN E. SLICK, OF JOHNSTOWN, PENNSYLVANIA, ASSIGNOR OF ONE-HALF TO LUTHER L. KNOX, OF AVALON, PENNSYLVANIA.

METHOD OF WELDING.

1,161,419. Specification of Letters Patent. Patented Nov. 23, 1915.

Application filed April 7, 1914. Serial No. 830,143.

*To all whom it may concern:*

Be it known that I, EDWIN E. SLICK, a citizen of the United States, and a resident of Johnstown, in the county of Cambria and State of Pennsylvania, have invented a new and useful Improvement in Methods of Welding, of which the following is a full, clear, and exact description, reference being had to the accompanying drawing, forming part of this specification, in which—

The figure is a cross section of a butt-weld joint constructed in accordance with my invention.

Heretofore in the butt-welding operation carried out either by electric welding or by the oxyacetylene process, the welded joint has not been as strong as the material welded.

The object of my invention is to provide a process by which the joint may be made as strong as the material welded together, thus giving a joint of one-hundred per cent. strength, or better, if desired.

Another object is to provide a cheap, rapid and effective method which will utilize material heretofore removed in producing the desirable strength at the joint.

Heretofore in electric welding and in oxyacetylene welding of butt joints the edges of the two metal plates or articles have been beveled by machining or shearing them. The edges have then been brought together and metal corresponding to the metal of the plates or other objects melted into the seam either by using a metal electrode in the electric arc process or by a stick of metal to the joint and allowing it to melt during the oxyacetylene welding. A separate metal stick has also been used for this purpose in electric arc welding. In all such methods, however, while a fairly good joint is obtained, yet it is not as strong as the plates or other objects which are thus welded.

I have discovered that by upsetting, swaging or otherwise thickening the metal of the plates or objects along the edges to be joined and then filling the joint with corresponding metal during the welding process which may be either electric or oxyacetylene, the joint may be strengthened and made as strong as the material joined, or even stronger, if desired. In thickening or upsetting the edges of the articles I preferably bevel these edges in the same operation, thus utilizing the metal which would otherwise be removed to thicken up the edges at the joint. I thus economize in material and make the process simple and cheap. This thickening operation will, of course, be performed before the welding operation.

In the drawing 2, 2 represent a pair of steel plates whose edges are to be welded, the joint being of any length and of any shape. As shown at 3, 3 the edges of these plates are thickened by upsetting the metal, preferably giving them the bevel shown at the same time, since this utilizes the excess metal and gives the desired bevel. The two thickened and beveled edges are then brought together or into proximity, a stick of steel is held in the joint and the welding is then carried out by any of the well known modern methods, the welding operation serving to melt the metal from a stick and weld it in the joint as shown at 4. If the joint is vertical the operation should start at the bottom so that the joint metal will be built up by gradually lifting the stick. If the joint is horizontal the operation may proceed along the joint. The edges of the plates may be tacked together preliminary to the main welding operation by welding them at separated intervals. The joint may extend in any direction, and may even be circular.

The advantages of my invention result from the stronger joint afforded and the ease and economy of the operation.

The process may be applied to any metals and any kinds of butt-welds. The beveling may be performed simultaneously with the upsetting, and otherwise, or the beveling may be done away with, and other changes may be made without departing from my invention, since I consider myself the first to form a welded butt joint by first upsetting the abutting edges and then welding them while filling in metal to complete the joint.

I claim:

1. The method of butt-welding, consisting in bringing into opposed relation previously thickened metal edges, thereby forming an outwardly opening joint, raising the edges to a welding heat, filling the joint from one end to the other by progressively melting into it extra metal of the same character by electric heat, and completing the welding by the usual steps while maintaining the thickened joint; substantially as described.

2. The method of butt-welding, consisting in unsymmetrically thickening the edges to be welded to give a joint open at one side, thereafter welding the thickened portions, and progressively melting extra metal into the successive portions of the joint to fill it from end to end while maintaining said joint in thickened condition, substantially as described.

3. The method of butt-welding, consisting in upsetting the edges to be welded, beveling them, and thereafter welding them and progressively melting extra metal into the successive portions of the joint to fill it from end to end while maintaining said joint in thickened condition, substantially as described.

4. The method of butt-welding, consisting in simultaneously upsetting and beveling the edges to be joined, and thereafter welding them and progressively melting extra metal into the successive portions of the joint to fill it from end to end while maintaining said joint in thickened condition, substantially as described.

5. The method of butt-welding, consisting in bringing into welding relation to each other two previously formed unsymmetrically thickened edges to form a joint opening outwardly, and then welding the same, and progressively melting extra metal into the successive portions of the joint to fill it from end to end while maintaining said joint in thickened condition, substantially as described.

6. The method of butt-welding, consisting in bringing two previously thickened metal edges into welding relation to each other in a position to form an outwardly opening joint, welding the same, and progressively melting into the successive portions of the joint extra metal of the same character as the edges while maintaining a thickened joint, substantially as described.

In testimony whereof, I have hereunto set my hand.

EDWIN E. SLICK.

Witnesses:
E. F. KENNEY,
A. DIX TITTLE.